Nov. 26, 1935.   N. H. GOWING   2,022,595
BATTERY PROTECTOR
Filed Dec. 19, 1932   2 Sheets-Sheet 1
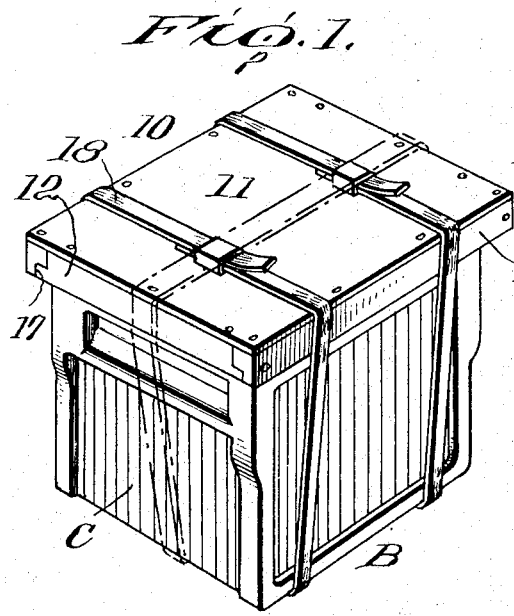
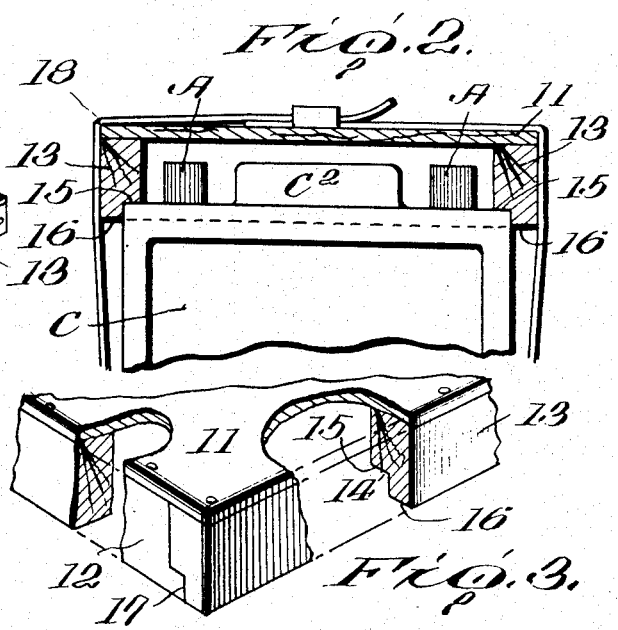
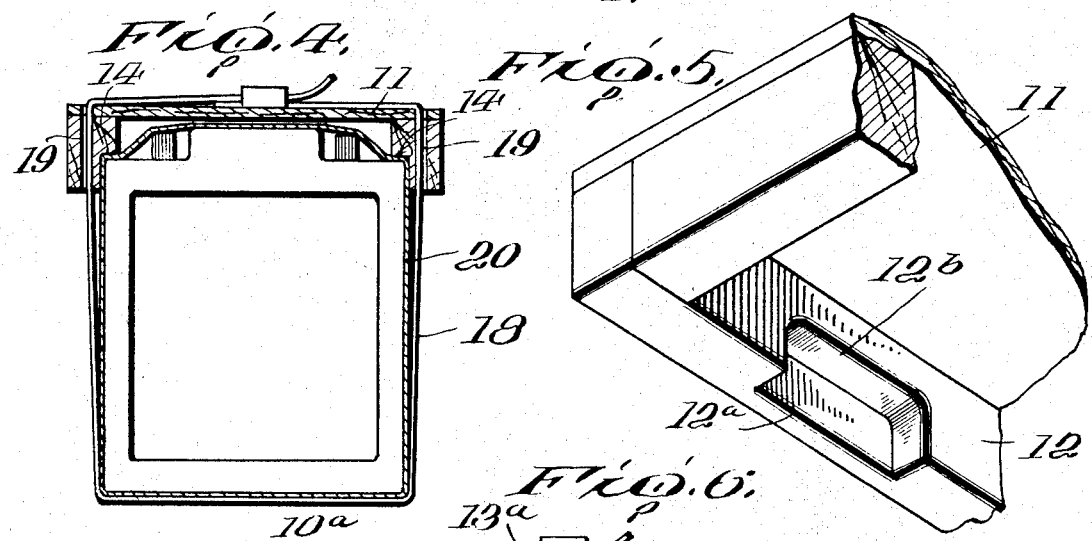
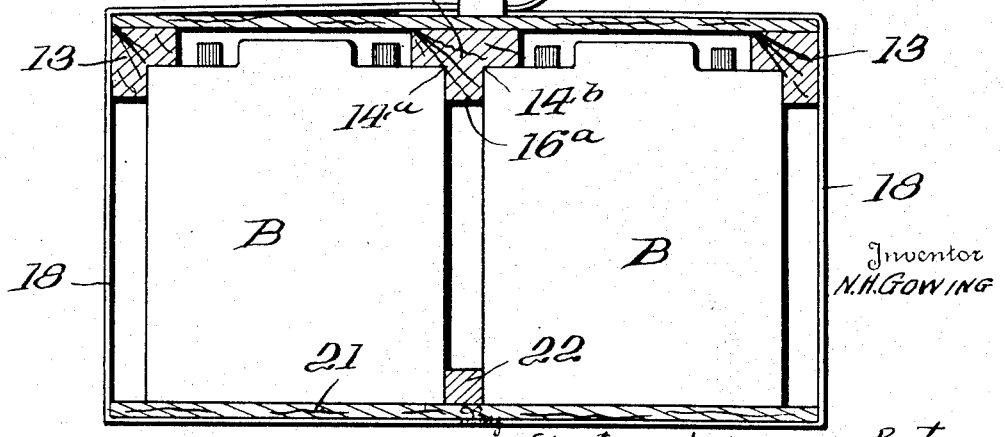
Inventor
N. H. GOWING
Sturtevant, Mason + Porter
Attorneys

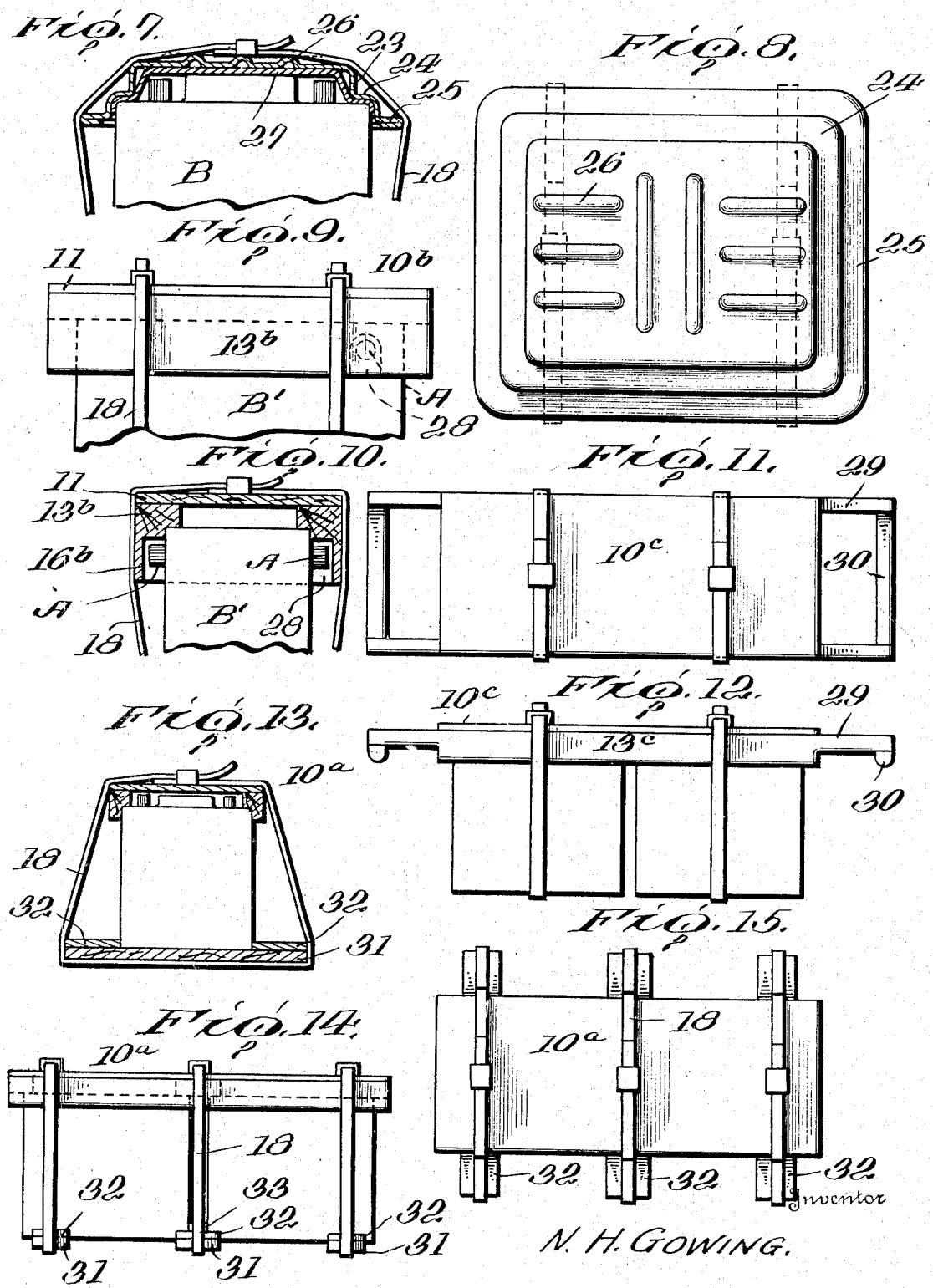

Patented Nov. 26, 1935

2,022,595

UNITED STATES PATENT OFFICE 2,022,595

BATTERY PROTECTOR

Nathan Howard Gowing, Norfolk, Va.

Application December 19, 1932, Serial No. 647,993

6 Claims. (Cl. 136—181)

This invention relates to improvements in covers or protectors for batteries, and more particularly to covers which are adapted to prevent any injury to electric storage batteries during transportation or storage.

An object of the present invention is to provide a battery cover which will efficiently prevent damage to or short circuiting of the terminals or cell connectors during transportation or storage.

A further object of the invention is to provide a battery protector which will prevent the casing and composition material of the battery from being damaged by a sudden impact or superimposed load.

A still further object of the invention is the provision of a battery cover wherein means are provided for preventing the accidental slippage or displacement of the cover during transportation or storage.

The invention further aims to provide a battery protector which will permit the stacking of batteries in railroad cars, trucks or other conveyances for transportation or in warehouses for storage in such a manner that the superimposed load is transmitted through the protector to the battery casings only, whereby the terminals, cell connectors and composition material are adequately protected.

A further object of the invention is to provide a battery cover which is adapted to prevent the casings from being chipped or otherwise damaged from the handling to which they are subjected during shipment and in storage.

The invention further aims to provide a battery cover or protector which is light in weight, strong, durable, inexpensively manufactured, readily applied, and thoroughly capable of protecting the battery from injury during transportation and storage.

These and other objects of the invention will be obvious and will in detail be hereinafter more fully described.

In the drawings:

Figure 1 is a perspective view showing the battery and protector therefor assembled.

Fig. 2 is an end view of the same showing the protector in section.

Fig. 3 is a fragmentary perspective view of the cover member in detail.

Fig. 4 is a view, similar to Fig. 2, but showing a slight modification.

Fig. 5 is a fragmentary perspective view of the cover member in a reverse position to show the modifications.

Fig. 6 is a view, partly in section, showing the application of the cover member to two batteries.

Fig. 7 is an end view showing a metallic cover member, in section, as applied to a battery.

Fig. 8 is a top plan view of the modification shown in Fig. 7.

Fig. 9 is a side view of a different type of battery with the protector applied thereto.

Fig. 10 is an end view, partly in section, of the same.

Fig. 11 is a top plan view of a protector provided with handles and having two batteries secured thereto.

Fig. 12 is a side view of the same.

Fig. 13 is an end view, partly in section, showing a slight modification wherein laterally extending base members are used.

Fig. 14 is a side view of the same.

Fig. 15 is a top plan view of the same.

This invention generally provides a battery protector in the form of a cover, two sides of which are adapted to rest on the edge of the battery casing. The cover prevents moisture or foreign material from getting to the terminals or cell connectors and thus effectually guards against damage thereto or short circuiting thereof. The cover affords an even top surface which permits the stacking of the batteries in such a way that no weight is borne by the soft composition material or the terminals of the battery, but only by the relatively hard battery casing. The protector is particularly advantageous in transporting batteries in less than carload lots because it is light in weight and because it occupies a minimum amount of space. The cover may protrude around the periphery of the battery casing and is thus adapted to protect the casing from damage or marking so that the battery will remain in a readily marketable condition upon reaching its destination. The cover is furthermore securely prevented from accidental displacement or slippage during transportation.

In the present instance, a storage battery B is illustrated with the cover member or protector 10 applied thereto. The battery has the usual terminals A, cell connectors and relatively hard casing C. The cover member 10 may be made of wood or other non-conductive material and generally comprises a top piece 11 to which are secured depending end and side members 12, 13 respectively. The lower interior corner of each of the side members 13 is provided with a longitudinal groove 14 which affords a horizontal ledge or supporting surface 15 and a downwardly extending edge portion 16. Each of the end members is provided with outwardly extending lugs 17 which fit into the ends of the grooves 14 of the side members. The end and side members, in addition to being suitably secured to the top piece 11, are themselves fastened together by any suitable fastening elements. Various ways of securing together the component parts of the cover member 10 may be employed without parting from the scope of this invention. The top piece 11 is of sufficient size to permit the end and side members to be secured thereto in such a manner that when the cover 10 is placed upon the storage battery B, the horizontal supporting surface 15 of the side members 13 will rest upon the edge of the casing C whereby the downwardly extending edge portions 16 will fit relatively close to the side of the casing and the end members 12 will extend downwardly over the ends of the battery casing and thus prevent the accidental slippage of the cover. The side members 13 are of sufficient height to allow the terminals and cell connectors to remain free so that they will not support any superimposed load. It is thus apparent that batteries may be stacked one upon the other and that the superimposed load will be transmitted through the side members to the casing only so that no strain is caused on the relatively soft composition material, or the terminals of the battery. Suitable binding elements 18 are secured laterally around both the cover and battery to prevent displacement of the cover and to allow the battery to be lifted by grasping the cover under the end members 12 or side members 13. These binding elements may be made of wire, cord or steel strapping or other suitable materials, and may, of course, extend longitudinally around the cover and battery as shown by the dotted lines in Fig. 1. It is also apparent that the protruding end and side members of the cover will assume any impact caused by sliding the batteries in transportation and thus prevent chipping or other damage to the casing. The cover, in addition to excluding moisture and otherwise prevent injury to the battery, affords a flat surface to permit the stacking of the batteries and also provides surfaces on which may be applied the name or trade-mark of the manufacturer or dealer, or other required data. The binding elements may be sealed in such a manner that it will be possible to know whether the battery has been tampered with at any time during transportation or storage by looking at the seal to determine whether the same has been broken.

In Fig. 4 a slight modification is shown. The binding elements 18, instead of passing on the outside of the side or horizontal members 13, are passed through slots 19 so that even less space is occupied. A wrapper or bag 20 of paper or the like is provided around the battery to further aid in protecting the battery and rendering the same marketable at its destination. This wrapper 20 provides a gasket or cushioning device between the casing C and the groove 14 is in the longitudinal members 13 and also affords an added surface to receive the name or trade mark of the dealer or manufacturer.

In Fig. 5, the side members 13 may be of a slightly shorter length and the end members 12 in this case are provided with recesses 12ª into which fit the handle portions C² of the battery casing C. The side members may or may not be provided with ledges 15. If the ledge portions 15 are omitted from the side members, the top faces 12ᵇ of the recesses 12ª provide the necessary bearing surfaces which rest upon the handle portions C² of the battery casing. The ledge portions 15 on the side members may be retained, however, as bearing surfaces, in which case the recesses 12ª serve to prevent horizontal displacement of the cover member.

In Fig. 6, it is shown that two or more batteries may be packed together. In this case there is provided, in addition to the two side members 13, a centrally located longitudinal member 13ª which is provided with two longitudinal grooves 14ª, 14ᵇ, the horizontal surfaces of each of which rest upon the corresponding edges of the casings of the two batteries B. The downwardly extending portion 16ª prevents the two batteries from contacting with each other. A base or supporting member 21 is positioned under the batteries and the binding elements 18 are adapted to be passed around the same. An additional stop member 22 is placed between the lower sides of the batteries to further prevent tilting or contacting of the same.

Having reference to Figs. 7 and 8, a metallic cover member 23 is employed. This cover member or protector is bent to form horizontal bearing surfaces 24 and an offset outwardly extending projection 25 around the periphery thereof. Strengthening ribs 26 may be conveniently provided in the cover 23. To prevent short circuiting of the terminals, an insulating gasket 27 is applied between the top of the battery B and the cover member. The usual binding elements 18 are applied in the same manner. It will be seen that the gasket 27 is between the bearing surfaces 24 and the edge of the casing so that a cushion is provided. It is apparent that the load is still transmitted through the bearing surfaces only to the battery casing and that the offset portions 25 protect the casing from any side impacts.

In Figs. 9 and 10 the improved protector is shown as applied to a motorcycle battery B', or the like, wherein the terminals A extend out from the side thereof. In this case the downwardly extending portions 16ᵇ of the side members 13ᵇ are provided with cut-out pockets 28 which are adapted to register with and protect the terminals A from injury or short circuiting.

In Figs. 11 and 12, the cover member 10ᶜ is shown with two batteries employed therewith. The side members 13ᶜ are extended to provide handle portions 29 which may be provided with cross pieces 30 if so desired. It is apparent, however, that handle portions may be provided with a single battery, if desired.

In Figs. 13, 14 and 15, the cover 10ª as shown in Fig. 6 is employed with two or more batteries. Base or supporting members 31 of substantial width are provided near the ends and center of the battery package to prevent the accidental tipping over of the batteries. Secured to the members 31 are stop members 32 which extend to the edge of the battery casing to limit the movement thereof. The central stop member 32 is provided with an additional member 33 which extends upwardly between the batteries to prevent the casing from moving or contacting with each other. While the base or supporting members have been shown where two or more batteries are shipped together, it is to be noted, however, that these supporting members 31 may be used with a single battery to provide added protection.

It is clear from the foregoing description that the transportation and storage of batteries is greatly facilitated by employing the protector 75 heretofore described. The cover members efficiently protect the batteries from damage and at the same time are light and occupy a minimum amount of space and are inexpensive to manufacture. It is, of course, obvious that minor details of construction and application may be made without departing from the scope of the invention.

Having thus fully described my invention, what I claim as new and desire to secure by Letters Patent, is:—

1. A protector for a battery having a casing, said protector including a cover member having depending peripheral portions extending below the top of said casing, said peripheral portions being provided with bearing surfaces adapted to rest upon the edges of said casing whereby to leave the battery terminals free, means for securing the battery and cover member together, said means including a plurality of spaced supporting members upon which the battery rests, and a plurality of binding elements each extending longitudinally of one of said supporting members and around the cover member whereby to securely hold the cover, batteries and supporting member together.

2. A protector for a plurality of storage batteries arranged side by side, said protector including a cover member having depending peripheral portions secured thereto, and adapted to extend below the tops of the battery casings, two of said parallel peripheral portions having cut out portions to provide bearing surfaces adapted to rest upon the edges of the battery casings, an intermediate member extending between adjacent batteries and having parallel bearing surfaces adapted to rest upon the corresponding top edges of the battery casings, a supporting member under the batteries and having an intermediate portion extending between adjacent batteries, and means for securing together the cover member, supporting member and batteries.

3. In a device for shipping and storing storage batteries, the combination of a storage battery having a relatively hard outer casing and a relatively soft composition top, of a cover adapted to be placed over the terminal end of said battery having an imperforate horizontal top portion and depending end and side members, said side members having inner right angled grooves the upper faces of which are adapted to rest only upon the top edge of said relatively hard outer casing whereby to protect the relatively soft composition material and to support the top portion of said cover above the terminals of the battery, said end members having outwardly extending lugs extending into the grooves in said side members and secured thereto and adapted to extend slightly over the ends of said battery to prevent lateral displacement of the cover, and flexible fastening strips extending around the bottom of said battery and over the cover whereby to retain the cover thereon.

4. In a device for shipping and storing electric storage batteries, the combination of a storage battery having a relatively hard outer casing and a relatively soft composition top, of a cover adapted to be placed over the top of said battery and having an imperforate horizontal top portion and depending peripheral portions extending below the top of said outer casing and snugly fitting against the same whereby to prevent lateral displacement of said cover, two of said peripheral portions opposite one another being provided with internal grooves the upper faces of which being adapted to rest directly and only on the top edge of said outer casing whereby to protect the relatively soft composition material and to support the top portion of the cover above the same, a plurality of spaced supporting members on which said battery rests, and a plurality of flexible fastening elements each extending under one of said supporting members and over said cover whereby to retain the cover on said battery.

5. In a device for shipping and storing electric storage batteries, the combination of a storage battery having a relatively hard outer casing and a relatively soft composition top, of a cover adapted to be placed over the top of said battery and having an imperforate horizontal top portion and depending peripheral portions extending slightly below the top of said outer casing and snugly fitting against the same whereby to prevent lateral displacement of said cover, two of said peripheral portions opposite one another being provided with internal grooves the upper faces of which being adapted to rest directly and only on the top edge of said outer casing whereby to protect the relatively soft composition material and to support the top portion of said cover above the same, means including flexible fastening elements extending beneath said battery and over said cover whereby to retain the cover on said battery, and handle members extending laterally from said cover and disposed beneath the plane of the top of said cover whereby the entire device may be conveniently lifted and stacked one upon the other.

6. In a device for shipping and storing electric storage batteries, the combination of a storage battery having a relatively hard outer casing and a relatively soft composition top, of a cover adapted to be placed over the top of said battery and having an imperforate horizontal top portion and depending side and end portions extending slightly below the top of said outer casing whereby to prevent lateral displacement of said cover, said side members having internal grooves the upper faces of which bear directly and only on the top edges of said outer casing whereby to protect the relatively soft composition material and to support the top portion of said cover above the same, a protective wrapper covering the top of said battery and disposed between the top edge of said outer casing and the faces of the grooves in said depending side members, and means including flexible fastening elements extending beneath said battery and over said cover whereby to hold said cover on said battery.

NATHAN HOWARD GOWING.